July 24, 1928.

O. W. WEBB

HOLD OVER GUIDE FOR LUMBER FINISHING MACHINES
AND ADJUSTING MEANS THEREFOR

Filed Nov. 6, 1924    2 Sheets-Sheet 2

Inventor
Orra W. Webb
By Reynolds
Attorneys

Patented July 24, 1928.

1,678,371

UNITED STATES PATENT OFFICE.

ORRA W. WEBB, OF SEATTLE, WASHINGTON, ASSIGNOR TO STETSON-ROSS MACHINE COMPANY, OF SEATTLE, WASHINGTON, A CORPORATION OF WASHINGTON.

HOLD-OVER GUIDE FOR LUMBER-FINISHING MACHINES AND ADJUSTING MEANS THEREFOR.

Application filed November 6, 1924. Serial No. 748,094.

My invention relates to lumber finishing machines and particularly to a lumber guide connected for adjustment to a cutter head, and to the means for dissociating the effect of shocks upon this lumber guide, such as are caused by lumber striking the guide at high speed, from the cutter head, while yet securing simultaneous adjustment of the two.

In lumber finishing machines such, for example, as matchers, sizers, or moulders, lumber is fed through the machine at a high rate of speed and must be engaged and held, adjacent the cutter heads, to enable them to properly finish the lumber. As the unfinished lumber varies in width or thickness, the hold-over guide must project into the path of the lumber sufficiently far to engage the narrowest board, yet must yield sufficiently to permit passage of the widest boards. Advancing as it does at a high rate of speed, it strikes such guides with great force, and heretofore it has always been considered essential to completely divorce the guide from the cutter head to the end that the force of the lumber striking the guides would not dislodge the cutter head or cause it to vibrate, thus rendering it inaccurate and destroying the smooth finish upon the lumber.

It is an object of my invention, therefore, to provide a construction of lumber finishing machines by means of which a guide, such as a roller, and generally designated a hold-over guide, may be positioned adjacent a cutter head to guide lumber therepast, but which is so connected to the cutter head that the cutter head and guide are coincidentally adjustable for varying the width of the lumber being dressed.

It is a further object to simplify and improve such guides and to provide a guide of this type which is simple and cheap, yet reliable in operation.

My invention comprises those novel parts and combinations thereof which are shown in the accompanying drawings, described in the specification, and particularly defined by the claims terminating the same.

In the accompanying drawings I have shown my invention embodied in a matcher, only such portions of the matcher being shown as are required to illustrate my invention, and my invention being shown in an embodiment which is now preferred by me.

Figure 2 is a section therethrough on the line 2—2 of Figure 1.

Figure 3 is a section on line 3—3 of Figure 2.

Figure 1:
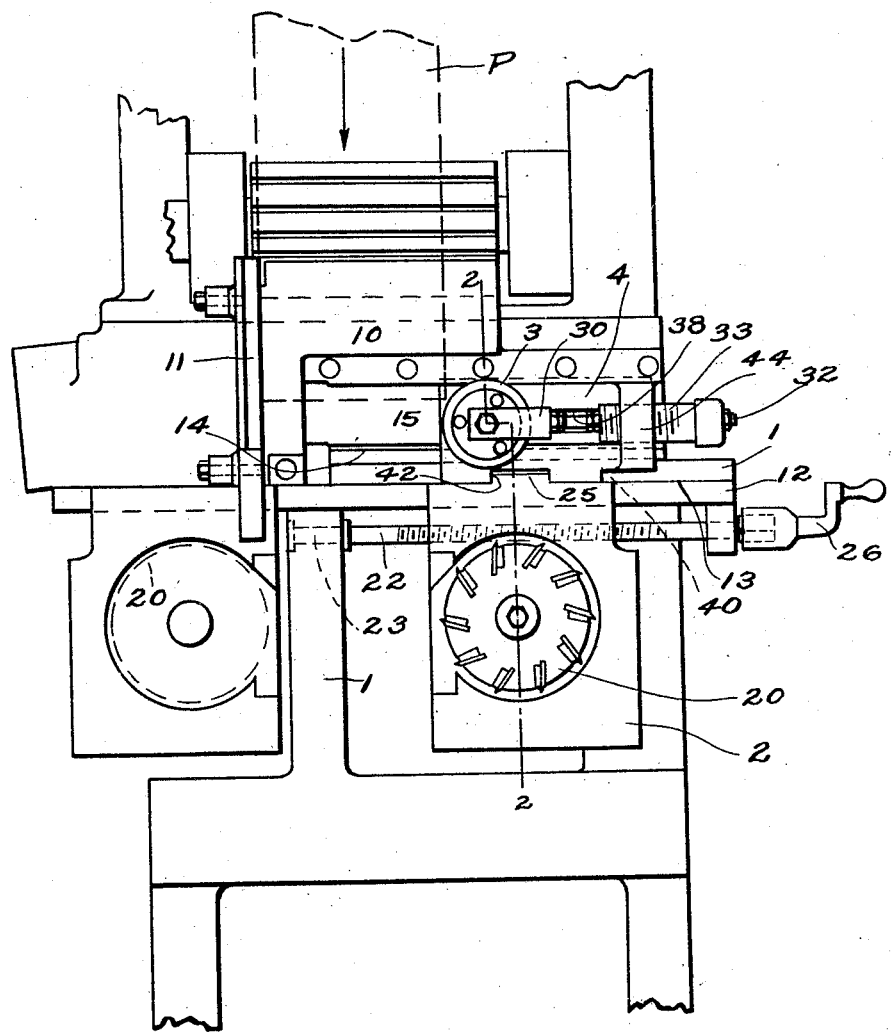
Figure 1 is a plan view of a matcher embodying my invention.

It should be understood that the details of the lumber finishing machine, such as the matcher shown in the present illustration form no part of my invention and may be varied at will. As shown herein, however, the machine includes a bed frame 1 which has an upper surface to form a table 10, lengthwise of which the lumber moves. A plank is indicated at P in Figure 1, moving in the direction of the arrow. At one side of the table a guide is supported from the bed frame, in this instance being a fixed guide rail 11 extending longitudinally of the table 10 and extending thereabove. Adjacent the guide 11 and on the opposite side of the table is mounted a cutter head 20. The precise form of this is immaterial, but preferably the cutter head is mounted for adjustment transversely of the table 10 upon a side head yoke 2 which itself is directly supported upon the bed frame 1. As a means for thus supporting the side head yoke I have shown a rib 21 resting in a guide 12 formed upon a transversely-extending vertical face 13 of the bed frame 1 (see Figure 2). Rotation of the cutter head 20 is secured in any suitable manner, as is common in the art. A second fixed cutter head 20' is indicated opposite the cutter head 20. This may or may not be employed, according to the design of the finishing machine. Adjustment of the side head yoke 2 is secured by suitable means, such as a screw 22 secured at 23 in the bed frame and passing through a nut 24 secured to the side head yoke 2. Such a screw may have a head adapted for engagement by a socketed handle 26.

Adjacent the cutter head 20, preferably in advance thereof, and cooperating with the fixed guide 11, but on the opposite side of the table 10 thereform, is provided an adjustable guide, such as the roller 3. While a roller is shown and at present preferred, this guide may assume any desired form, as for example, a shoe, the two being equivalents. This guide roller is supported in such a manner that it is adjustable transversely of the table 10 and also so that it will yield under the force of passing lumber tending to force it outward. Yielding of the roller 3 is permitted by journaling it in a yoke 30 which yoke is slidable in opposition to a spring, as 31, in a carriage 4.

This carriage is guided in the bed frame 1 for movement transversely of the table 10 in a direction paralleling the direction of movement of the side head yoke 2. For this purpose I have shown the carriage 4 as having a rib 40 received in a transversely extending slot 14 which runs parallel to the guide 12 but is cut into a horizontal surface 15 of the bed frame 1, in the form shown herein. For holding the carriage 4 in place upon the surface 15 I may provide a bar 16 which is secured upon the bed frame, and the upper surface of which, instead of the bed frame proper, forms the table 10.

Adjustment of the carriage 4 transversely of the table 10 is secured by connecting it to the side head yoke 2, but this connection is formed in such manner that the shocks upon the roller 3 are transmitted with the least force and effect to the side head yoke. This is secured to a large extent by placing the rib 40 at the side of the carriage 4 opposite the side of the roller first engaged by the lumber as it advances, and adjacent the cutter head, so that the shocks to the roller 3 and its carriage 4 are primarily absorbed by the bed frame and not transmitted to the side head yoke 2. The connection between the carriage and side-head yoke may be formed in a number of ways, but as shown herein this connection comprises simply a lug 25 engaging in a notch 42 in the adjacent side of the carriage 4 (see Figure 1). By this means transverse adjustment of the side-head yoke 2 automatically effects adjustment of the carriage 4 coincidentally therewith and by a like amount.

Any suitable manner of supporting the roller or its yoke 30 from the carriage whereby it is yieldable may be employed. For this purpose I have shown a threaded rod 32 secured directly to the yoke 30 and extending through a spring housing 33 supported directly from the carriage 4, the end thereof opposite the roller 3 being flanged upward as indicated at 44, to receive the housing 33. The rod 32 extends through the end of this housing opposite the yoke 30, where a nut 34 controls the projection of the roller 3 under the influence of the spring 31. It will be understood that the spring is under compression between the inner end of the housing 33 and a washer 35 secured thereon by lock nuts 36, by means of which the spring tension may be adjusted. The yoke itself is formed with a guide rib 37 upon its under side, this being received in a guide 38 in the upper surface of the carriage 4, being secured in place by a removable gib 39.

The roller itself, while it may be of any suitable construction, yet is preferably formed of an outer ring 3, the ends of which are closed by plates 3′ to enclose a chamber between them. In this chamber are fitted ball-bearings 30′, by means of which the roller is journaled upon a pin 31′ fixed in the yoke 30.

As lumber, such as the plank P, advances in the direction of the arrow in Figure 1, its advancing edge will encounter first the roller 3 which will yield against the spring 31, but which will force the plank over against the fixed guide 11. The components of the force exerted by the plank against the roller, longitudinally and transversely of the table 10, are taken up, respectively, by the guide rib 40 in its groove 14 as explained hereabove, and by the spring 31. The longitudinal component, in the direction of movement of the lumber, is far the greatest, and this is transmitted to the bed frame, none whatever being received by the side head yoke. In this manner, though the total amount of force exerted against the roller 3 be considerable, little if any of this force is transmitted to the side-head yoke 2, but nearly all of it is absorbed by the bed frame 1 or by the spring 31. The side-head yoke 2 is thus kept from undue vibration or disturbing shocks, and the cutter head 20 remains always in the position to which it is adjusted. When it is desired to adjust the cutter head for a different width, however, manipulation of the crank 26 will move the side-head yoke 2 in or out, and by engagement of the lug 25 and the notch 42 the carriage 4 is at the same time moved thereby, so that the roller 3 supported upon the carriage is at all times maintained in proper position relative to the cutter head 20 and the path of movement of the lumber through the machine.

While the shock is transmitted from the carriage 4 to the bed frame 1 the initial shock is transmitted from the yoke 30 to the carriage 4, and it is for this reason that the renewable gib 39 is employed. As this becomes worn it may be readily replaced.

What I claim as my invention is:

1. In a lumber-finishing machine, in combination, a side head yoke adjustable transversely, a cutter head carried by said side head yoke, a guide roller positioned to engage the lumber in advance of said cutter head, means independent of the side head yoke for supporting said guide roller, said guide roller support being movable transversely in a path parallel to the path of said side head yoke, means permitting transverse yielding of said guide roller independently of its support, means connecting said support and said side head yoke for simultaneous transverse movement, and means for adjusting said latter connected members transversely.

2. In a lumber-finishing machine, in combination, a bed-frame having a horizontal and a transversely-extending vertical face, a side-head yoke guide extending transversely of the vertical face, a side head yoke supported and guided therein for transverse movement, means for adjusting the position of said side head yoke in said guide, a cutter head carried by said side head yoke, a transverse guide on the horizontal face of said frame extending parallel to said side-head yoke guide, a support independent of said side-head yoke supported and guided in said guide in the horizontal face for transverse movement, a guide roller supported therein to engage the lumber in advance of said cutter head, and means interengageable directly between said side-yoke and said support for simultaneous movement transversely.

3. In a lumber-finishing machine, in combination with a table and a guide at one side thereof, a side-head yoke adjustable transversely of said table at the side opposite said guide, a cutter head carried by said side-head yoke, a guide roller positioned opposite said first guide and cooperating therewith to guide lumber past said cutter head, means independent of the side-head yoke for supporting said roller, said means being adjustable transversely of the table, means for adjusting said side-head yoke transversely, and means interengageable directly between said side-head yoke and said guide roller support for adjusting the latter coincidentally with adjustment of the side head yoke.

4. In a lumber-finishing machine, in combination, a side head yoke adjustable transversely, a cutter head carried by said side head yoke, a guide roller positioned to engage the lumber in advance of said cutter head, means independent of the side head yoke for supporting said guide roller, said guide roller support being movable transversely in a path parallel to the path of said side head yoke, means for adjusting said side-head yoke transversely, said guide roller support having a notch and said side-head yoke having a lug lying within said notch, whereby transverse movement of said side-head yoke is communicated to said support.

5. In a lumber-finishing machine, in combination with a bed-frame including a table, and a guide fixed at one side thereof, a side-head yoke supported directly upon said bed-frame and adjustable transversely of said table, and at the side thereof opposite said guide, a cutter head carried by said side-head yoke, a guide roller positioned opposite said fixed guide and in advance of said cutter head, a carriage independent of the side head yoke and supported and guided directly on said bed-frame for movement parallel to said side-head yoke, means yieldingly supporting said guide roller from said carriage, means for adjusting said side-head yoke transversely, and means connecting said side-head yoke and said carriage for coincidental adjustment thereof.

6. In a lumber-finishing machine, in combination, a cutter head adjustable toward and from the path of movement of the lumber, a fixed guide opposite said cutter head, a hold-over guide adjacent and on the same side as said cutter head, independent supports and guides for said cutter head and hold-over guide upon a common frame member, means for adjusting said cutter head, means intimately connecting said cutter head and said hold-over guide for simultaneous adjustment, and means between said hold-over guide and its support permitting its yielding independently of said support and the cutter head.

7. In a lumber finishing machine, in combination with a bed frame, a cutter head supported from said bed frame and guided for adjustment thereon transversely of the direction of movement of the lumber, a guide roller positioned adjacent said cutter head to engage lumber moving therepast, a carriage supporting said roller and itself supported from said bed frame for transverse adjustment, means interposed between said carriage and bed frame for transmitting to the latter all shocks in the direction of movement of the lumber, means intimately connecting said cutter head and said carriage for coincidental transverse adjustment, and manually operable means for adjusting said connected carriage and cutter head transversely of the direction of movement of the lumber.

8. In a lumber-finishing machine, in combination with a bed frame having a horizontal surface, a cutter head, a side-head yoke supporting said cutter-head and itself guided upon and supported from said bed frame for adjustment transversely of the direction of movement of the lumber, a guide roller positioned to engage the lumber in advance of said cutter head, a carriage supporting said roller and resting upon the horizontal surface of said bed frame, said carriage and bed frame having a cooperating guide rib and groove extending transversely of the direction of movement of the lumber, said guide rib and groove being positioned on the side of the carriage and roller opposite that first engaged by the lumber and formed to transmit shocks in the direction of movement of the lumber to the bed frame, means intimately connecting said carriage and side-head yoke for coincidental transverse adjustment, and means operable at will for adjusting the position of said connected side-head yoke and carriage transversely of the direction of movement of the lumber.

9. In a lumber-finishing machine, in combination with a bed frame having a horizontal surface, a cutter head, a side-head yoke supporting said cutter-head and itself guided upon and supported from said bed frame for adjustment transversely of the direction of movement of the lumber, a guide roller positioned to engage the lumber in advance of said cutter head, a carriage supporting said roller and resting upon the horizontal surface of said bed frame, said carriage and bed frame having a cooperating guide rib and groove extending transversely of the direction of movement of the lumber, said guide rib and groove being positioned on the side of the carriage and roller opposite that first engaged by the lumber and formed to transmit shocks in the direction of movement of the lumber to the bed frame, means yieldable transversely of the direction of movement of the lumber and interposed between the roller and its carriage, means connecting said carriage and side-head yoke for coincidental transverse adjustment, and means for adjusting the position of said connected side-head yoke and carriage transversely of the direction of movement of the lumber.

10. In a lumber-finishing machine, in combination, a frame, a side head yoke supported and guided directly upon said frame for adjustment transversely of the direction of movement of the lumber, a cutter head carried by said side head yoke, means for adjusting said side head yoke, a lumber-engaging guide separate from and in advance of said cutter head, and supported and guided directly upon said frame for movement parallel to the side head yoke, and means intimately connecting said side head yoke and guide for adjustment of the latter upon adjustment of the former.

11. In a lumber-finishing machine, in combination, a frame having two transverse guides, a side head yoke supported upon said frame and having guide means complemental to and engaging one of said guides on the frame, a cutter head carried by said side head yoke, a stock-engaging presser member in advance of said cutter head, said presser member being supported directly upon said frame, independently of the side head yoke, and having complemental guide means engaging the second guide thereon, means for adjusting one only of said transversely slidable members for transverse adjustment relative to the frame, and an operative connection between the yoke and presser member, and forming the sole connection therebetween, for effecting transverse adjustment of one upon adjustment of the other.

12. In a lumber-finishing machine, in combination, a frame, a side head yoke and a presser member at the feed side of said yoke, said yoke and presser member being each supported upon said frame independently of the other, and being transversely adjustable thereon, means for adjusting one of said members, and means forming the sole connection between said members operative to effect the adjustment of one upon the adjustment of the other.

13. In a lumber-finishing machine, in combination, a frame, a side head yoke supported directly on and adjustable transversely of said frame, a cutter head carried by said side head yoke, means for adjusting said side head yoke, a lumber-engaging guide separate from said side head yoke, and supported directly on said frame for unrestrained transverse movement adjacent the cutter head, and means forming an intimate but sole connection between said guide and said side head yoke for transverse adjustment of the former upon adjustment of the latter.

14. In a lumber-finishing machine, in combination, a cutter head adjustable toward and from the path of movement of the lumber, a lumber guide adjacent said cutter head and engageable with lumber as it passes said cutter head, independent supports and guides for said members upon a common frame member, and permitting unrestrained transverse movement of said guide, means for adjusting said cutter head, and means intimately connecting said cutter head and said guide for simultaneous adjustment.

Signed at Seattle, King County, Washington, this 27th day of October, 1924.

ORRA W. WEBB.